United States Patent [19]

Clerc

[11] 4,357,501
[45] Nov. 2, 1982

[54] TROLLEY POLE MECHANISM FOR USE ON ELECTRICALLY-POWERED ROAD VEHICLES

[75] Inventor: Alain M. Clerc, Arcueil, France

[73] Assignee: Faiveley S.A., Bauer, France

[21] Appl. No.: 190,225

[22] Filed: Sep. 24, 1980

[30] Foreign Application Priority Data

Sep. 25, 1979 [FR] France .............................. 79 23765
Mar. 21, 1980 [FR] France .............................. 80 06308

[51] Int. Cl.³ .............................................. B60L 5/10
[52] U.S. Cl. ........................................ 191/83; 191/66
[58] Field of Search .................... 191/57, 60.4, 72, 73, 191/74, 78, 83, 66

[56] References Cited

U.S. PATENT DOCUMENTS

| 3,998,305 | 12/1976 | Torok | 191/72 X |
| 4,205,736 | 6/1980 | Seidl | 191/83 X |

FOREIGN PATENT DOCUMENTS

| 941854 | 4/1956 | Fed. Rep. of Germany . |
| 2460843 | 7/1976 | Fed. Rep. of Germany . |
| 366374 | 10/1906 | France . |
| 935715 | 6/1948 | France . |
| 1597044 | 7/1970 | France . |
| 2252931 | 6/1975 | France . |
| 217666 | 6/1942 | Switzerland . |
| 11947 | of 1909 | United Kingdom . |
| 1480311 | 7/1977 | United Kingdom . |

*Primary Examiner*—Richard A. Schacher
*Attorney, Agent, or Firm*—Diller, Ramik & Wight

[57] ABSTRACT

A trolley pole mechanism for an electric vehicle fitted with an auxiliary power source draws power from overhead lines in a raised position. Its terminal unit comprises two contact heads, sensors responsive to contact with an overhead line, and head guides. A linkage articulated to the roof of the vehicle supports the terminal unit and maintains it perpendicular to and allows it to move perpendicular to the longitudinal axis of the vehicle. In one embodiment the linkage comprises two trolley poles each supporting a respective contact head. In an alternative embodiment the terminal unit is coupled to the roof of the vehicle by a single trolley pole which carries a linkage defining two articulated parallelograms. The linkage includes a tube which pivots about a horizontal axis on a turret on the roof of the vehicle swivelling about a vertical axis.

21 Claims, 16 Drawing Figures

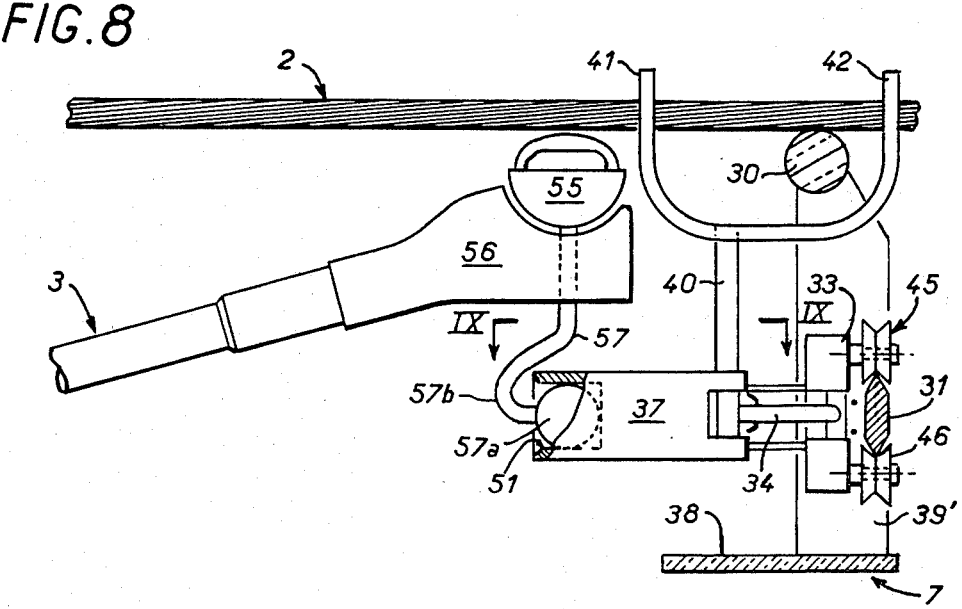
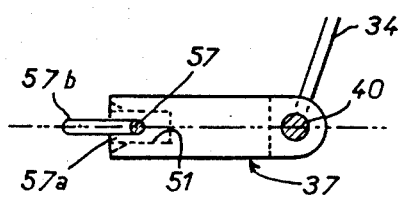
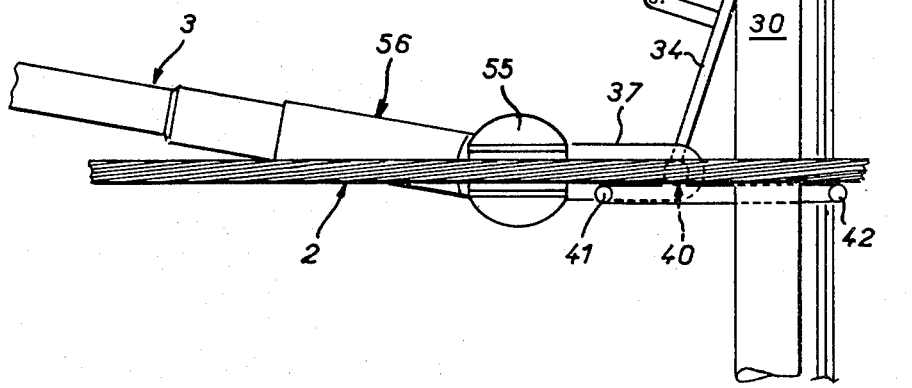

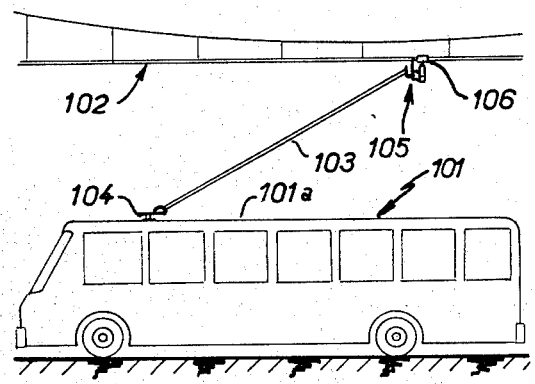
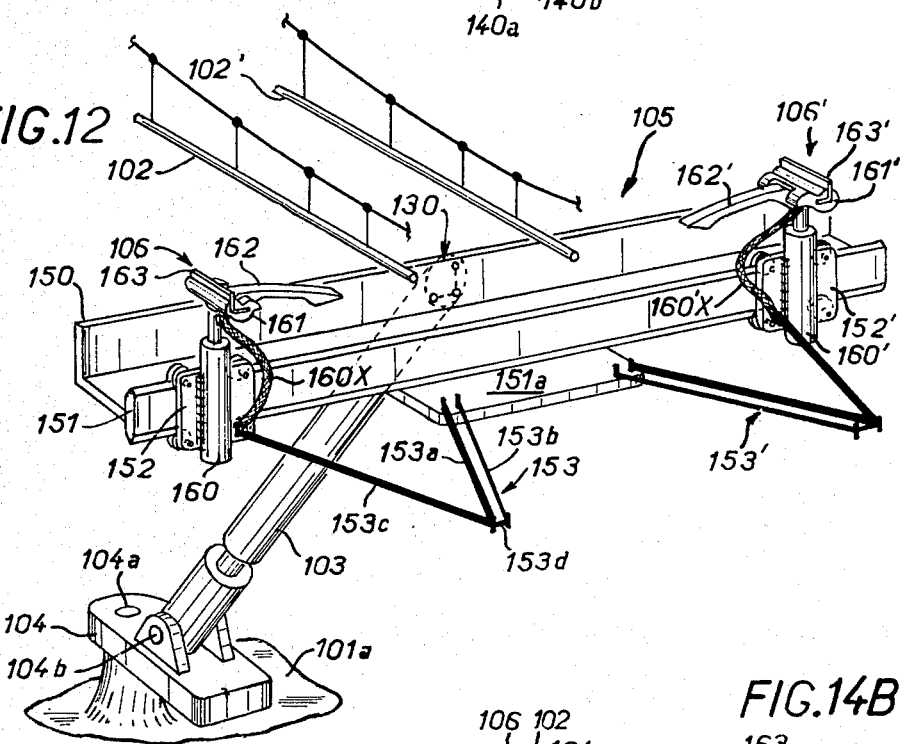
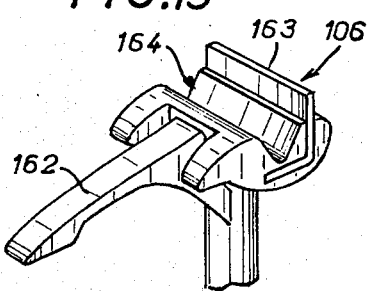
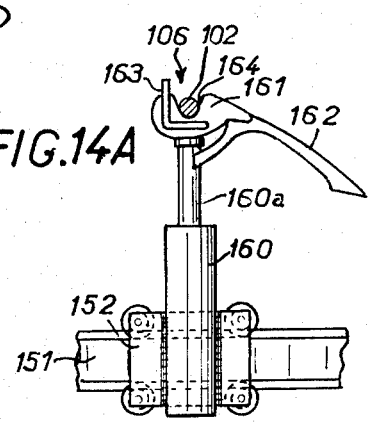
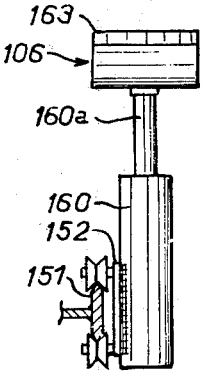

TROLLEY POLE MECHANISM FOR USE ON ELECTRICALLY-POWERED ROAD VEHICLES

BACKGROUND OF THE INVENTION

1. Field of the Invention

The present invention relates to a trolley pole mechanism for use on an electrically-powered vehicle which draws power from a pair of overhead lines by means of two trolley pole contact arms.

2. Description of the Prior Art

Electrically-powered road vehicles, especially public transport vehicles known as trolleybuses, generally draw electrical power from a pair of overhead lines through two trolley poles articulated to the roof of the vehicle and carrying respective contact heads which rub on the overhead lines. The trolley poles pivot in a vertical plane and resilient means urge them upwards into contact with the corresponding overhead line. The trolley poles also pivot around a vertical axis to permit the vehicle to move laterally relative to the vertical plane passing through the center line of the pair of overhead lines. In their stowed position the trolley poles are folded down against the roof of the vehicle, where they are held in position by means of hooks. Such vehicles are generally fitted with an auxiliary source of electrical power in the form of a battery or generator set, to enable them to move and maneuver to a limited extent with the trolley poles stowed. Deploying the trolley poles involves raising them from the lowered or stowed position to a raised position in which the skid at the end of the pole comes into contact with the respective overhead line from below.

The trolley poles are usually deployed manually, with the vehicle at rest. Attached to the poles adjacent the contact head is a cord which is sufficiently long to remain accessible from ground level with the trolley pole in the completely raised position. These are generally attached to winches known as trolley catchers which are activated when the trolley pole is suddenly released, the skid losing contact with the overhead line, to prevent the trolley pole cutting the lines. To deploy the trolley poles manually, an operator disengages each pole from its hook by pulling on the cord, allowing it to rise slowly and guiding it by pulling laterally on the cord, until the head of the pole is engaged beneath the overhead line. The other trolley pole is then deployed in the same way. This process is somewhat lengthy, and requires a certain degree of skill in that it involves positioning the end of the pole to an accuracy of approximately 1 centimeter laterally and a few centimeters vertically so as to engage an overhead line at least 6 meters above the ground, by maneuvering the trolley pole which is some 6 meters long. As the contact heads of the trolley poles are fitted with skids which pivot as they slide along the overhead line, it is often necessary to adjust the angular position of these skids with the trolley poles in the lowered position, so that when the trolley poles are deployed contact is made properly.

An automatic deployment system for trolley poles has been proposed by the German company Dornier. Motors are coupled to the poles where they are mounted on the vehicle to control the up and down motion and the rotary motion about the vertical axis. The rods are fitted with mechanical sensors comprising a retractable ear on the outside of the trolley pole head, extending above the level of the head. The deployment sequence is electronically controlled and involves first raising the trolley pole heads and simultaneously pivoting the poles around the vertical axes so that the heads move to a position approximately 0.5 meters below the overhead lines, extending a relatively large distance to either side of the overhead lines as seen in plan view. This raising sequence has three final positions: median, righthand and lefthand, so that the pair of overhead lines is correctly bracketed whether the vehicle is below the center line of the pair of overhead lines or to its left or right. In a second stage, the trolley pole heads are raised vertically by approximately half the distance separating them from the overhead lines. In a third stage the heads move closer together until the ears come into contact with the respective overhead lines, so as to orient the corresponding skid. In the final stage the heads are raised, the ears sliding over the overhead lines, until each head comes into contact with the respective line, the ears then retracting rearwards to disengage the contact heads.

Using this system, the driver must select a final position for the first stage, including the height of the trolley pole head above ground, according to the position of the vehicle relative to the overhead lines and the height of the lines above the ground. To ensure that the overhead lines are correctly bracketed, the three final positions available must overlap and the maximum distance either side of the vertical plane through the center line of the pair of overhead lines is approximately equal to the width of the vehicle. Also, the trolley poles must be deployed with the vehicle stationary, as the engagement of the ears with the overhead lines is not compatible with vehicle movement. Moreover, the tolerances in respect of the final position of the first stage are too small to ensure that the position selected when initiating deployment will still be suitable in the final stages, as a result of changes of direction in the event that the vehicle is moving during deployment of the trolley poles.

SUMMARY OF THE INVENTION

The invention is intended to provide a trolley pole mechanism for use on electrically-powered vehicles which does away with the need to select an angular position and height for the trolley poles, provided that the pair of overhead lines is within the boundary of the vehicle as seen in plan view.

Another objective of the invention is to provide a trolley pole mechanism for use on electrically powered vehicles which is operable with the vehicle in motion, to permit the vehicle to maneuver using its auxiliary power source without first stopping.

A further objective of the present invention is to provide a trolley pole mechanism which can be fitted to a conventional electrically-powered vehicle having two trolley poles, without fundamental modification to the trolley poles.

The present invention consists in a trolley pole mechanism for use on an electrically-powered road vehicle fitted with an auxiliary power source, the mechanism drawing power from a pair of overhead lines when in a deployed or raised position and comprising a terminal unit comprising two contact heads and laterally disposed sensors on a cross-member responsive to contact with an overhead line from below by bringing the contact heads into contact therewith, guide means for said contact heads, linked to said cross-member, and a linkage articulated to the roof of the vehicle, supporting the terminal unit and maintaining it perpendicular to the longitudinal axis of the vehicle while allowing it to move in the direction perpendicular to the longitudinal axis of the vehicle.

According to one embodiment of the invention, the terminal unit is coupled to the roof of the vehicle by a single trolley pole which carries a linkage defining two articulated parallelograms.

This arrangement does away with the use of a separate trolley pole for each overhead line, a hangover from tram and trolleybus vehicles in which the trolley poles were deployed manually. The result is a particularly compact current collector system. It should be noted that this arrangement is possible only because the vehicle is fitted with an auxiliary source of power ready to take over from the overhead lines as a source of power, and because the present system allows the trolley poles to be deployed with the vehicle in motion, so that the overhead lines do not need to comprise spurs and crossovers, features with which it is advantageous to use separate trolley poles.

The length of the terminal unit will normally be substantially equal to the width of the vehicle, so as not to project beyond the sides of the vehicle when the linkage is folded down on the roof.

The trolley pole mechanism is deployed in the following manner: in the initial position the linkage is folded down on the roof and the guide means carrying the contact heads are at opposite ends of the terminal unit. The linkage is raised until the cross-member carrying the laterally disposed sensors comes into contact with the overhead lines from below, the contact heads bracketing the overhead lines. The guide means are brought together until the laterally disposed sensors come into contact with the overhead lines, indicating the contact heads are in contact with the respective overhead lines, instead of the sensor system cross-member.

The aforementioned guide means preferably comprise carriages rolling on a rail and means such as pivoted compass arms coupling the terminal unit to the carriages so as to move the carriages conjointly in opposite directions, this movement maintaining the contact heads at the same separation as the overhead lines as the vehicle maneuvers.

Other objects and advantages will appear from the following description of an example of the invention, when considered in connection with the accompanying drawing, and the novel features will be particularly pointed out in the appended claims.

IN THE DRAWINGS

FIG. 8 is a partially cut away side view of the terminal unit, showing the contact manipulating means coupled to the contact head of a trolley pole.

FIG. 9 is a cross-section on line IX—IX in FIG. 8.

FIG. 10 is a plan view showing the contact head coupling means.

FIG. 11 is a side view of a vehicle fitted with an alternative embodiment of device in accordance with the invention.

FIG. 12 is a schematic view of the mechanism in accordance with the invention, as applied to the vehicle shown in FIG. 11.

FIG. 13 is a schematic representation of a linkage forming part of the mechanism in accordance with the invention as shown in FIGS. 11 and 12.

FIGS. 14a and 14b show a carriage supporting a contact head.

FIG. 15 is a more detailed representation of a contact head.

DESCRIPTION OF THE PREFERRED EMBODIMENT

Figure 1:
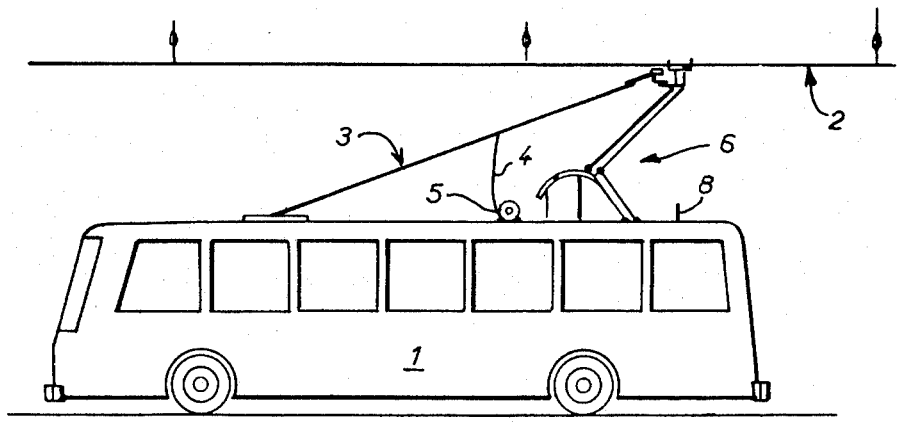
FIG. 1 is a side view of an electrically-powered vehicle fitted with a mechanism in accordance with the invention.
Figure 2:
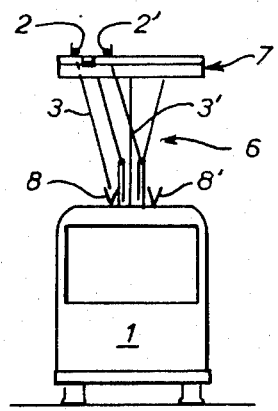
FIG. 2 is a rear view of the vehicle shown in FIG. 1.

Referring to FIGS. 1 and 2, an electrically-powered public transport vehicle 1 draws electrical power from a pair of overhead lines 2, 2' through two trolley poles 3, 3' articulated to the roof of the vehicle so as to pivot around a horizontal axis for up and down movement and around a vertical axis so that the vehicle may move to either side of the path defined by the pair of overhead lines 2, 2'. In terms of the features described thus far, the vehicle 1 is of conventional design.

The trolley poles may be folded down against the roof of the vehicle by drawing in cords 4 by means of winches 5, similarly to the conventional "trolley catcher" arrangement. In this lowered position the trolley poles engage in guides 8, 8' comprising pairs of divergent horns which ensure that the trolley pole heads are precisely located with the poles in this lowered position.

The vehicle 1 is fitted with an automatic deployment system comprising a pantograph 6 carrying a terminal unit 7 which, as the pantograph 6 is deployed, follows a path which substantially coincides with the upward path of the trolley pole heads. The terminal unit 7 will be described in more detail below. It extends transversely of the vehicle, across substantially its entire width. The heads of poles 3, 3' are coupled, as will be described in more detail below, to the terminal unit 7 during this deployment, so as to be raised to the level of overhead lines 2, 2' when terminal unit 7 comes into contact with the overhead lines.

Figure 3:
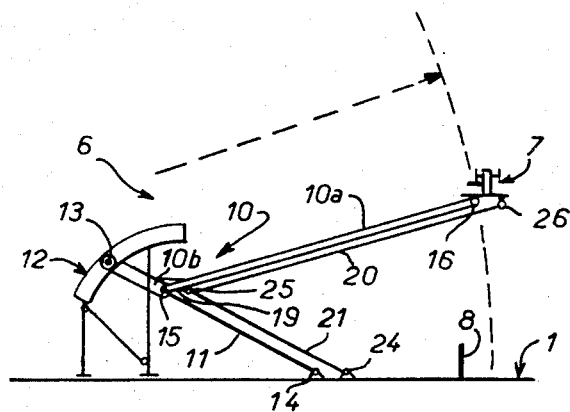
FIG. 3 is a schematic representation of pantograph lifting means.

As seen more clearly in FIG. 3, pantograph 6 comprises a frame 10 with two pairs of arms 10a, 10'a and 10b 10'b defining a V-shape. A link 11 is articulated to the roof of the vehicle at point 14 and to frame 10 at point 15 at which arms 10a and 10b join. A substantially circular cam 12 is attached to the roof of the vehicle and acts as a guide for a roller 13 at the free end of arm 10b. Terminal unit 7 is pivoted to the free end 16 of arm 10a. Two arms 20 and 21 equal in length to arm 10a and link 11, respectively, are pivoted together at point 25 and coupled by a link 19 to pivot point 15, so forming with arm 10a and link 11 a system of articulated parallelograms, the respective sides of which are formed by the separation of pivot point 16 and 26 on terminal unit 7 (arm 20 is pivoted to terminal unit 7 at point 26), and pivot points 14 and 24 on the roof of the vehicle (arm 21 is pivoted to the vehicle roof at point 24). This system of articulated parallelograms ensures that terminal unit 7 remains in the same orientation as pantograph 6 is maneuvered. The position of pivot point 14 on the roof of the vehicle, the lengths of link 11 and arms 10a and 10b and the angle between these arms are determined in conjunction with the shape of cam 12 so that the path of terminal unit 7 is substantially the same as those of the trolley pole heads, namely a part-cylinder relative to an axis passing through the points at which the trolley poles are pivoted to the roof of the vehicle.

Figure 4:
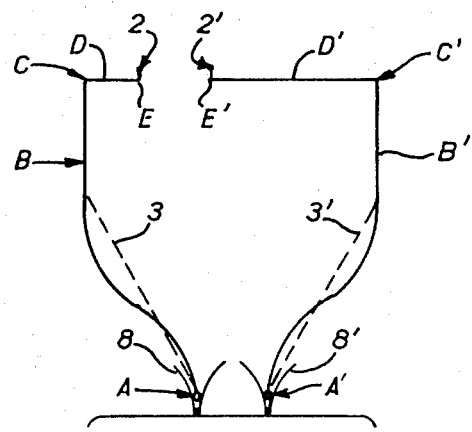
FIG. 4 is a schematic representation of the paths of the contact heads of the trolley poles during deployment of the latter, as seen in the plane transverse to the longitudinal axis of the vehicle.
Figure 5:
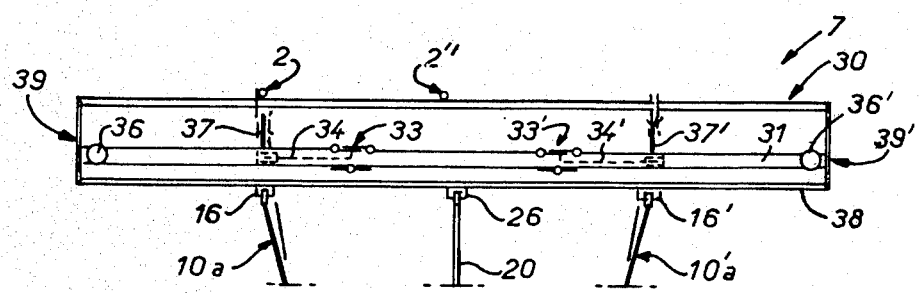
FIG. 5 shows the terminal unit of the pantograph lifting means, as seen from the rear.

The deployment of the trolley poles will now be described with reference to FIG. 4. Initially the trolley pole contact heads are in the lowered position A, A', where they are coupled to two handling trolleys which can move along the terminal unit, the horns 8 and 8' acting as guides. The terminal unit and carriages are not shown in FIG. 4, but will be described in more detail below. In the first stage of the deployment of the trolley poles, the pantograph unfolds while the carriages slide away from one another to the ends of the terminal unit, so that the trolley pole heads follow paths B and B', respectively. The paths of trolley poles 3 and 3' are shown in dashed line. When the terminal unit comes into contact with overhead lines 2, 2', the pole heads are at position C, C'. The carriages are then moved towards one another (D, D') and stopped when the trolley pole heads are at positions E and E', a short distance below the respective overhead lines 2 and 2'. The trolley poles are then disengaged from the carriages and move into contact with the overhead lines. The pantograph is folded down, the carriages returning to their median position in line with guides 8 and 8', so as to be coupled to the trolley poles when returned to the lowered position.

It will be appreciated that the various stages of the trolley pole deployment sequence are controlled by a logic programmer associated with sensors indicating the median and extreme positions of the carriages on the terminal unit, a sensor responsive to contact of the terminal unit with the pair of overhead lines, and sensors responsive to the relative position of the overhead lines, associated with the carriages. Only these latter sensors will be described in more detail below, as the arrangement of the other sensors and the logic programmer will be evident to the man skilled in the art, in the light of the specific design features of the terminal unit to be described below.

As shown in FIGS. 5 to 8, terminal unit 7 is an elongate frame with a top bar 30 made from an insulating material to avoid short-circuiting overhead lines 2 and 2'. It further comprises a lower plate 38 to which arms 10a and 10'a of the pantograph are pivoted at points 16 and 16'. Parallel arm 20 is pivoted to plate 38 at point 26, as already explained with reference to FIG. 3. Contact bar 30 and plate 38 are attached together by means of side flanges 39 and 39' and support a guide 31 of prismatic cross-section parallel to bar 30. Two carriages 33 and 33' slide on guide 31, being driven by motors 36 and 36' disposed at the ends of guide 31 as will be described in more detail below. Horizontally and outwardly extending arms 34 and 34' are pivoted to carriages 33 and 33'. At their ends are handling heads 37 and 37' which will be described below with reference to FIGS. 7 to 10.

Figure 6:
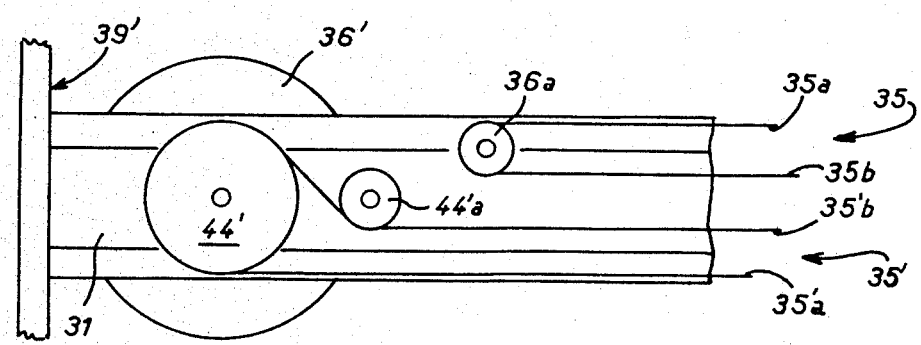
FIG. 6 shows the drive system for the contact head manipulating means.

Referring in particular to FIG. 6, showing the righthand end of the terminal unit as seen from the front of the vehicle (the opposite direction to that in FIG. 5), guide 31 supports motor 36' for moving righthand carriage 33', adjacent flange 39. This motor is fitted with a pulley wheel 44' around which passes a cord 45' which also runs around an idler pulley wheel at the other end of guide 31, symmetrically disposed relative to pulley wheel 36a which acts as an idler wheel for cord 35 which pulls the lefthand carriage 33. An auxiliary pulley wheel 44'a tensions cord 35' in the section 35'b attached to carriage 33', drawing section 35'b to one side to make room for cord 35. Pulley wheel 44' incorporates a torque sensor responsive to the tension in section 35'a due to handling head 37' coming into contact with an overhead line by stopping the motor rotating in the sense which pulls on section 35'a, as will be described in more detail below. It will be appreciated that motor 36 is symmetrically arranged relative to motor 36'.

Figure 7:
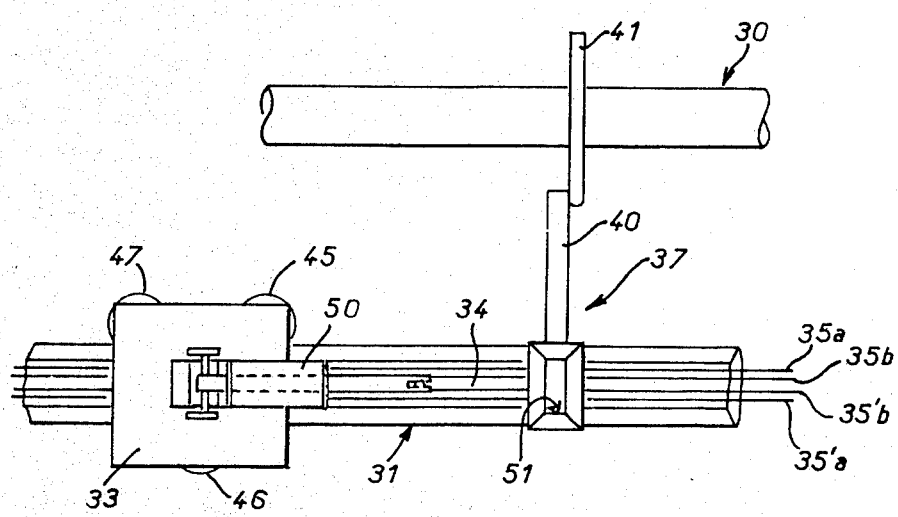
FIG. 7 is an elevation showing the contact head manipulating means and associated sensor for detecting an overhead line.

Carriage 33 of head 37 and the head of trolley pole 3 will now be described with reference to FIGS. 7 to 10. Note that FIG. 7 is an elevation as seen from the front of the vehicle, in which the head of trolley pole 3 is omitted, whereas FIG. 8 is a side view in which terminal unit 7 is partially cut away. FIG. 10 is a plan view of overhead line 2.

Carriage 33 is retained on guide 31 by three grooved rollers, 45 and 47 above guide 31 and 46 below. Arm 34 pivots about vertical axes on carriage 33 and head 37. Head 37 is moved to and fro by rotating arm 34 by means of a piston and cylinder actuator 50 disposed between carriage 33 and arm 34.

Trolley pole 3 includes a head 56 in which is mounted a pivoted skid 55 formed conventionally with a groove in which overhead line 2 engages when trolley pole deployment is terminated. Skid 55 is mounted on a vertical spindle 57 which extends downwardly in a swanneck section 57b which terminates in a disk 57a, the axis of which intersects that of spindle 57. Its vertical side faces are parallel to the groove in skid 55. Disk 57a constitutes a tenon which engages in a mortice 51 in head 37, aligned with the pivot axis of arm 34 and flaring outwardly at its open end.

Extending upwardly from head 37 is a vertical rod 40 coaxial with the pivot axis of arm 34. Mounted on it with a lateral offset is a fork whose arms 41 and 42 pass one on each side of contact bar 30, so that when arms 41 and 42 contact overhead line 2 laterally the axis of rod 40 is in the vertical median plane through overhead line 2, head 37 and mortice 51 lying in this same plane. At this time tenon 57a and skid 55 are also aligned with this median plane.

It will be understood that during the final stages of deploying the trolley poles with carriage 33 approaching the other carriage (moving upwards as seen in FIG. 10), head 37 may be in any angular position within the overall limits defined by end stops. This is the case until arm 41 or 42 comes into contact with the overhead line. As the carriage continues to move, rod 40 pivots until the other arm (42 or 41) in turn comes into contact with the overhead line. At this time the tension in cord section 35a stops motor 36 and movement of carriage 33, as already explained with reference to FIG. 6. The head 56 of trolley pole 3 is then in the exact position for engagement with the overhead line, with skid 55 correctly oriented. Carriage 33' and head 37' perform the symmetrical maneuvers to those described, at the same time. When carriages 33 and 33' are stopped, piston and cylinder actuator 50 (and the corresponding piston and cylinder actuator for the other carriage) pushes back arm 34 to release tenon 57a from mortice 51, so completing trolley pole deployment. The pantograph is then folded down.

The clearance between arms 41 and 42 of the fork is sufficient on either side of contact bar 30 to permit the forward or rearward movement of head 37. It will also be understood that when trolley poles 3 and 3' are lowered, with pantograph 6 folded down, piston and cylinder actuator 50 is operated so that mortice 51 engages over tenon 57a to hold the trolley poles in the lowered position, the position and orientation of heads 37 and 37' being controlled by any suitable means (such as end stops or springs, for example) so as to correspond precisely with the position of the tenons of the heads of the trolley poles in the lowered position, so that carriages 33 and 33' are centrally positioned back to back on guide 31, with heads 37 and 37' arranged parallel to the longitudinal axis of the vehicle.

As has already been explained, the pantograph is deployed to deploy the trolley poles, carriages 33 and 33' moving away from one another to the ends of guide 31 on terminal unit 7, so that fork arms 41, 42 and 41', 42' (not shown) are sure to be outside the overhead lines provided that the vehicle is on the correct track, in which position contact bar 30 can be brought into contact with the two overhead lines. This stops the upward movement and the carriages approach one another to complete the deployment sequence.

It will be clear that the width of the track within which the vehicle must be located to deploy the trolley poles is virtually twice the width of the vehicle less the distance between the overhead lines, typically 4 meters approximately, symmetrically disposed relative to the median axis of the overhead lines, by virtue of the fact that terminal unit 7 must not extend beyond the sides of the vehicle. However, temporary projection beyond the sides of the vehicle is acceptable for components located above the maximum height of standard vehicles, and it frequently happens that the heads of the troley poles extend beyond the vehicle profile. Thus pantograph 6 may be mounted on a plate which is movable sidways under the control of the driver as the pantograph is raised, under which conditions the track within which trolley pole deployment is possible may be increased by some 1.5 meters in width without the pantograph extending beyond the profile of the vehicle at roof level.

An alternative arrangement is to enable terminal unit 7 to slide sideways at the end of pantograph 6.

MODIFICATION

In the embodiment shown in FIG. 11, an electric road vehicle 101 draws current from a pair of overhead lines 102 by means of a device 103 which is similar in general appearance to a conventional trolley pole mechanism, articulated to the roof 101a of vehicle 101 by means of a swivelling turret 104, its free end carrying a terminal unit 105 supporting contact heads 106. Vehicle 101 is fitted with a self-contained auxiliary power source, such as an accumulator battery, for example, to permit it to maneuver while drawing power from the auxiliary source outside its normal track as defined by overhead lines 102. During such maneuvers, mechanism 103 is folded down against roof 101a. This enables vehicle 101 to carry out such maneuvers as parking and changing route. The battery may be recharged from the overhead lines.

The operational flexibility of the vehicle is enhanced by rendering the changeover between the auxiliary power supply and the overhead line power supply automatic, but subject to the control of the driver of the vehicle, whether the vehicle is at rest or in motion. Changeover with the vehicle in motion is required for such maneuvers as parking against the sidewalk on wide roads to permit passengers to board and alight, overtaking another vehicle on the same track, crossing intersections without complex arrangements of the overhead lines, travelling over sections of track where it is not possible to install overhead lines and avoiding congested traffic.

To be usable with the vehicle in motion the trolley pole mechanism must be deployable from the roof the vehicle until the terminal unit is at overhead line level and lowered from this level to the stowed position on the roof. Turret 104 must be able to align mechanism 103 with the overhead lines as it is raised and with the longitudinal axis of the vehicle as it is lowered. These movements are controlled by servo motors under the control of the driver. Once the contact heads are engaged beneath the overhead lines the servo motors are disengaged by means of a clutch mechanism, engagement of the heads aligning mechanism 103 which is urged vertically upwards against the overhead lines by an elastic compensating system. The design of a control system using servo motors is a simple matter for the man skilled in the art, and thus will not be described in more detail here.

Referring to FIG. 12, the trolley pole mechanism 103 comprises a tube pivoted around horizontal axis 104b to turret 104 which pivots around vertical axis 104a on the roof 101a of the vehicle. At the free end of mechanism 103 is terminal unit 105, the orientation of which is controlled by linkages pivoted to it at 130 and extending down tube 103, as will be described in more detail with reference to FIG. 13. The length of terminal unit 105 is substantially equal to the width of the vehicle, and unit 105 is maintained perpendicular to the longitudinal axis of the vehicle. Its center point is also maintained in alignment with this axis.

Towards the front of the vehicle terminal unit 105c carries a cross-member 150 which, in a first phase of the deployment sequence, comes into contact with overhead lines 102, 102' from below. Slightly to the rear is a prismatic cross-section rail 151 on which roll carriages 152 and 152', mounted on rollers. Beneath rails 151 and providing a space to permit the passage of carriages 152 and 152' is a panel 151a to which are pivoted pairs of compass arms 153 and 153', which are used to move carriages 152 and 152', respectively, along rail 151. The compass arms 153 and 153' are symmetrical, and only compass arms 153 will be described in detail. The two arms 153a and 153c are of equal length and are pivotally joined to one another at one end. The other ends are pivoted to panel 151a and carriage 152, respectively. Arm 153c is extended by a bracket 153d to which is pivoted an auxiliary arm 153b maintained parallel to arm 153a. As arm 153a pivots on panel 151a arm 153c causes carriage 152 to move, arms 153a and 153c forming the two equal sides of an isosceles triangle. If arm 153b were not present, the transmission system would have a dead point when arms 153a and 153c were superposed. In this position arm 153b is perpendicular to bracket 153d and the pull or push of arm 153b on bracket 153d overcomes this dead point, so that the carriage can move to the right or left of the point at which the compass arm is pivoted to the panel. The points at which compass arms 153 and 153' are pivoted to panel 151a are equidistant from the center of rail 151, and separated by the standard distance between overhead lines 102 and 102'. The compass arm piston and cylinder actuators act simultaneously on the two parallel arms 153a and 153b and are operated conjointly.

Carriages 152 and 152' carry respective vertical piston and cylinder actuators 160 and 160', the piston rods extending vertically upwards. The piston rods are prevented from rotating and carry at their upper ends respective contact heads 106 and 106' including grooved contact members 161 and 161' which can be aligned on the piston rod. Attached to the respective piston rods are engagement ramps 162 and 162' which extend towards one another. Mounted on contacts 161, 161' on the side opposite the ramps are upwardly extending stops 163, 163'. Piston and cylinder actuators 160 and 160' are in hydraulic communication with one another through a conduit (not shown) so that the piston rods move in complementary directions, one being raised as the other is lowered. When not acted on by the piston and cylinder actuators, the heads are maintained at the same level by an elastic system (not shown). This differential arrangement provides for compensating for differences between the heights of the two overhead lines and for uneven vehicle trim. If the plane through the overhead lines and the plane of the vehicle roof are not parallel, one piston and cylinder actuator may be extended and the other retracted by the same amount, without any loss of contact.

A similar hydraulic control system (not shown) is advantageously provided for differential maneuvers of the two sets of compass arms 153, 153' controlling movement of carriages 152, 152', as will be described below.

The compass arms 153a and 153c of each pair are also used as electrical conductors carrying the currents drawn through their respective contact heads 106, the electrical connections to which bypass piston and cylinder actuators 160 by means of the braided conductors 160X.

In FIG. 13, which represents mechanism 103 schematically, three links 131a, 131b, 131c of equal length are pivoted to cross-member 150 at points 130a, 130b, 130c and to the roof of the vehicle at points 140a, 140b, 140c. Pivot points 140a and 140b are aligned transversely of the vehicle axis and point 140c is vertically above 140a. Pivot points 130a, 130b and 130c are arranged analagously on cross-member 150. In practice link 131a comprises the tube of the trolley pole mechanism. Pivot points 140a, 140b, 130b and 130a form an articulated parallelogram which maintains the transverse orientation of cross-member 150. Similarly, pivot points 140a, 140c, 130c and 130a form an articulated parallelogram maintaining the vertical orientation of cross-member 150.

FIGS. 14 and 15 show more clearly the arrangement of head 106 at the end of piston rod 160a of piston and cylinder actuator 160, mounted on carriage 152 rolling on rails 151. Contact member 161 is insulated from piston rod 160a and formed with a groove 16 engaging overhead line 102. It will be appreciated that when carriage 152 moves from the left as seen in FIG. 14a the end of ramp 162 engages beneath overhead line 102 which is raised relative to rail 151. As the carriage continues to move the line moves along ramp 162 until it contacts end stop 163, which trims the orientation of head 106 relative to overhead line 102, which then drops into slot 164. End stop 163 is able to retract in response to an excessive sideways load, whereupon overhead line 102 is released towards the outside, so avoiding damage to the overhead line 15, for example, the vehicle moves violently to one side.

The deployment sequence will now be described, mainly with reference to FIG. 12. When stowed, trolley pole mechanism 103 is folded down against the roof of the vehicle and aligned with its longitudinal axis, carriages 152 and 152' being at the ends of rail 151, substantially in the position shown in this figure. The vehicle is powered from the auxiliary battery. To initiate the deployment sequence the driver raises the trolley pole 103 while swivelling turret 104 around axis 104a so that the terminal unit is located beneath the overhead lines. Terminal unit 103 is raised until cross-member 150 bears elastically against overhead line 102 and 102'. This contact is sensed to trip the movement of carriages 152 and 152' toward one another. When one of rams 162 and 162' is engaged beneath the corresponding overhead line the compass arms continue to act on the carriage whose movement is still unrestricted until the ramp thereon engages the other overhead line. As the carriages continue to move towards one another, the overhead lines move along the ramps to the contact heads, the unit moving down appropriately. As has already been described, end stops 163 and 163' contribute to the orientation of contact heads 106 and 106' relative to the overhead lines. When the overhead lines are both engaged in their respective slots, the presence of voltage on the cables connecting the contact heads to the control system of the vehicle is sensed to switch the vehicle's drive motors to the main power supply. The traverse systems of carriages 152 and 152' are disengaged.

The position of a carriage, as determined by the position of the compass arms or the average of the two carriage positions controls the offset of turret 104, so that the distance between the vehicle axis and the vertical plane through the center line of the overhead lines is accommodated by means of the lateral displacement of carriages 152, 152' on the terminal unit and by the angular offset of this turret.

If the driver wishes to select the auxiliary battery supply he lowers the trolley pole mechanism 103. As the lowering sequence proceeds, turret 104 returns to its axial orientation as the carriages move out to the ends of terminal unit 105.

If the vehicle moves to either side of the path of the overhead lines to a greater extent than is permitted by the swivelling movement of turret 104, the overhead line corresponding to the carriage at the end of rail 151 disengages from the contact head by causing end stop 163 or 163' to retract. The absence of the overhead line voltage causes the trolley pole mechanism 103 to be folded down. The design of the electronic or electromechanical control systems for the various phases of this movement will be apparent to the man skilled in the art and thus will not be described here.

Allowing for a vehicle width of 2.50 meters and a distance between overhead lines of approximately 0.6 meters, with center, left and right positions of the turret which overlap in terms of the contact areas with the overhead lines, the vehicle can move to 2.30 meters either side of the median plane of the overhead lines without losing contact therewith. This is also the width of the track within which the trolley pole mechanism may be deployed. An experienced driver is able to judge the offset of the vehicle relative to the overhead lines when deploying the trolley pole mechanism, as the lines are visible to the front of the vehicle. The driver may be relieved of the need to judge the appropriate position of the turret by means of an electromagnetic system comprising, for example, coils which sense a carrier frequency transmitted through the overhead lines.

It will be understood that various changes in the details, materials and arrangements of parts, which have been herein described and illustrated in order to explain the nature of the invention, may be made by those skilled in the art within the principle and scope of the invention as expressed in the appended claims.

For example, the trolley pole pivoted to a turret may be replaced by a pantograph carrying a terminal unit which slides to fulfil the same function as is implemented by the swivelling movement of the turret.

I claim:

1. A trolley pole mechanism for use on an electrically powered road vehicle fitted with an auxiliary power source, the mechanism drawing power from a pair of overhead lines when in a deployed or raised position and comprising two trolley poles, each of said poles articulated to the roof of the vehicle and supporting a contact head, lifting means supporting a terminal unit comprising an isolating cross member, means for maintaining said cross member perpendicular to the longitudinal axis of the vehicle and manipulating means being clamped to said contact heads while said lifting means are being raised, said manipulating means being mounted on and movable transversely of said terminal unit, laterally outwardly disposed sensors being fitted on said manipulating means, said cross member being responsive to contact with said pair of overhead lines for transversely moving said manipulating means from respective ends of said cross member so that said sensors contact said overhead lines, thereby bringing contact heads into contact with respective overhead lines.

2. A mechanism according to claim 1, wherein said lifting means comprise a pantograph arranged so that as the terminal unit is raised it described a part-cylindrical path relative to an axis passing through the points at which the trolley poles are pivotally attached to the vehicle.

3. A mechanism according to claim 1, wherein each trolley pole is fitted with first coupling means aligned vertically with the contact head and said contact head manipulating means comprise second coupling means complementary to said first coupling means and means for tripping said first and second coupling means.

4. A mechanism according to claim 1, wherein the contact head manipulating means are mounted on the ends of arms which pivot about vertical axes on carriages which move along the terminal unit.

5. A mechanism according to claim 4, wherein each contact head comprises a skid which pivots to align with the corresponding overhead line, the coupling means on each trolley pole including a tenon member attached to and aligned with the skid, the corresponding head manipulating means pivoting about a vertical axis at the end of said pivoted arm and including a mortice member complementing said tenon member, the associated sensor comprising a forked member attached to and pivoting with the head manipulating means with two arms which project above the terminal unit in a vertical plane parallel to the mortice member and cooperate with means responsive to simultaneous contact of both arms with an overhead line.

6. A mechanism according to claim 5, wherein each carriage is moved by a looped cord wound in by a motor mounted on the terminal unit, said means responsive to simultaneous contact of both arms with an overhead line sensing the torque opposing the drive action of the motor.

7. A mechanism according to claim 5, wherein said means for tripping said first and second coupling means comprise a piston and cylinder actuator coupled to the pivoted arm.

8. A mechanism according to claim 1, wherein said lifting means are movable transversely of the vehicle.

9. A mechanism according to claim 1, wherein said terminal unit is movable transversely of said lifting means.

10. A mechanism according to claim 1, wherein the length of the terminal unit is substantially equal to the width of the vehicle.

11. A trolley pole mechanism for use on an electrically powered road vehicle fitted with an auxiliary power source, the mechanism drawing power from a pair of overhead lines when in a deployed or raised position and comprising a single trolley pole articulated to the roof of the vehicle and supporting a terminal unit comprising an isolating cross member, two contact heads mounted on guide means with laterally outwardly disposed sensors, said guide means being mounted on and movable transversely of said terminal unit, and means for maintaining said cross member perpendicular to the longitudinal axis of the vehicle, said cross member being responsive to contact with said pair of overhead lines for transversely moving said guide means from respective ends of said cross member so that said sensors contact said overhead lines, thereby bringing contact heads into contact with respective overhead lines.

12. A mechanism according to claim 11 wherein the length of the terminal unit is substantially equal to the width of the vehicle.

13. A mechanism according to claim 11, wherein the single trolley pole carries a linkage defining two articulated parallelograms coupling the terminal unit to the roof of the vehicle.

14. A mechanism according to claim 11, wherein the terminal unit comprises a rail on which roll two carriages constituting said guide means for the contact heads.

15. A mechanism according to claim 14, wherein the terminal unit comprises actuator means coupled to the carriages to move them conjointly in opposite directions.

16. A mechanism according to claim 15, wherein said carriage actuator means comprise compass arms pivoted to the terminal unit and to respective carriages.

17. A mechanism according to claim 11, wherein the contact heads are disposed at the ends of vertical piston and cylinder actuators coupled together to move said heads in opposite directions by equal amounts.

18. A mechanism according to claim 11, wherein each contact head comprises a ramp inclined towards the base of the other contact head and, on the side opposite said ramp, an upwardly extending end stop constituting one of said laterally disposed sensors.

19. A mechanism according to claim 18, wherein said end stops are retractable.

20. A mechanism according to claim 11, wherein said linkage includes a tube which pivots about a horizontal axis on a turret on the roof of the vehicle swivelling about a vertical axis.

21. A mechanism according to claim 16, wherein the compass arms coupled to each carriage also act as electrical conductors carrying the currents drawn from the overhead lines by the respective contact heads.

* * * * *